to 250°C with hexamethylenetetramine or with an am-

United States Patent [19]
Sears et al.

[11] 3,984,225
[45] Oct. 5, 1976

[54] SOIL CONDITIONERS AND FERTILIZERS FROM SPENT SULFITE LIQUOR

[75] Inventors: Karl David Sears; Franklin Willard Herrick, both of Shelton, Wash.

[73] Assignee: International Telephone and Telegraph Corporation, New York, N.Y.

[22] Filed: Aug. 19, 1974

[21] Appl. No.: 498,759

[52] U.S. Cl. .................................. 71/25; 71/54; 71/63; 71/64 F; 71/64 SC
[51] Int. Cl.² .......................................... C05F 5/00
[58] Field of Search ............... 71/1, 11, 25, 26, 28, 71/44, 54, 63, 64 E, 64 F, 64 SC, DIG. 2, 30; 260/248.5

[56]  References Cited
UNITED STATES PATENTS
2,279,200    4/1942    Keenen .............................. 71/32 X Primary Examiner—Charles N. Hart
Assistant Examiner—Robert H. Spitzer
Attorney, Agent, or Firm—J. B. Raden; H. J. Holt

[57]  ABSTRACT

Spent sulfite liquor is converted into a nitrogen containing, water insoluble product useful as a soil conditioner and as a slow-release fertilizer. The spent sulfite liquor is reacted at a temperature of from 170° to 250°C with hexamethylenetetramine or with an ammonia-formaldehyde mixture. The weight ratio of hexamethylenetetramine or ammonia and formaldehyde to SSL solids should be greater than about 0.5:1 and preferably greater than 1:1.

10 Claims, No Drawings

SOIL CONDITIONERS AND FERTILIZERS FROM SPENT SULFITE LIQUOR

This invention relates to nitrogen containing, water insoluble products prepared from spent sulfite liquor and to a process for their preparation.

Slow-release nitrogen sources are desirable as fertilizers for pasture, turf and lawn grasses, ornamentals, trees and vegetables. Considerable attention has also been given to the search for more persistent forms of nitrogen fertilizers for use in forest fertilization.

Many attempts have been made to convert spent sulfite liquor, essentially a waste by-product from the preparation of wood pulp by the sulfite process, into useful products. Many of these attempts have involved investigations of the utility of these materials as soil additives to improve plant growth. The investigations have included pressure ammoniation of spent sulfite liquor at elevated temperatures to give products with up to about 10% nitrogen and the heating of spent sulfite liquor with an alkaline substance such as calcium hydroxide to produce a soluble desulfonated lignin which is then ammoniated to obtain products containing a 8 to 10% nitrogen which are utilizable as a fertilizer. However, none of these products has proved commercially useful, either for reasons of cost or because of property deficiencies in the product.

It is an object of the present invention to provide a high nitrogen containing, water insoluble product from spent sulfite liquors which is useful as both a soil conditioner and a fertilizer.

It is an additional object of this invention to convert a hitherto essentially waste byproduct into a useful product which enhances plant and seedling growth without toxic or other deleterious side effects on the plants.

The products of the invention are prepared by reacting spent sulfite liquor at a temperature of from 170° to 250°C with a reactant selected from the group consisting of hexamethylenetetramine and ammonia-formaldehyde mixtures. The resulting products are useful as slow-release nitrogen fertilizers and as soil conditions.

"Spent sulfite liquor" (SSL) as used herein refers to spent sulfite liquor derived from the pulping of wood with a solution containing sulfurous acid and sodium or ammonium bisulfite. Such spent sulfite liquors have a relatively low pH (e.g. 1.5 to 4.0) and the lignin contained therein is considered to be in the form of lignosulfonic acids and lignosulfonic acid salts of ammonium or sodium. Such liquors also contain large quantities of reducing sugars, predominantly mannose and glucose, derived through hydrolysis of the carbohydrate fraction of the wood by the acidic cooking liquor. The spent sulfite liquors also include ammonium and sodium-base spent sulfite liquors which were originally obtained by the acid-sulfite pulping of wood with sulfurous acid-bisulfite solutions of other bases but which were subsequently converted to ammonium- or sodium-base. Examples of the latter include ammonium- and sodium-base spent sulfite liquors prepared from calcium-base spent sulfite liquor by (1) treatment with ammonium or sodium sulfate or sulfite under pH conditions such that the calcium is substantially precipitated, or (2) cation exchange.

The reaction with the SSL may be carried out with either hexamethylenetetramine, (also called hexamine — prepared by reacting formaldehyde with ammonia in a 3:2 molar ratio) or with a mixture of ammonia and formaldehyde. Where ammonia and formaldehyde are used, the molar ratio of ammonia:formaldehyde should be at least 0.5:1.0 to produce reaction products with high nitrogen levels. For best results, the ammonia:formaldehyde molar ratio should be less than 2.1. The weight ratio of hexamethylenetetramine or ammonia and formaldehyde to SSL solids should be greater than about 0.5:1, preferably greater than 0.9:1 and even more preferably greater than 1:1. An excess by weight of hexamethylenetetramine or ammonia and formaldehyde over SSL solids is desirable to drive the reaction to completion and thus maximize nitrogen content and yield. The temperature of reaction may be from 170° to 250°C, with temperatures of from 200° to 230°C being preferred. The reaction time may range from 15 minutes to 3 hours or even longer, but is preferably from 30 minutes to 2 hours, the specific time depending upon temperatures, concentrations and proportions of reactants and pressures. The reaction may be conducted in a sealed vessel or in the open atmosphere.

The invention will be better understood in connection with the following examples in which all parts and percentages are by weight, unless otherwise indicated.

EXAMPLES 1 to 12

A 55 gallon drum of ammonia-base SSL was concentrated to a total solids content of 57% having a viscosity of 6.4 poises. The concentrated SSL had the following analyses:

| | |
|---|---|
| Nitrogen (total) | 2.4% |
| Sulfur (total) | 6.7% |
| Sulfite (as S) | .4% |
| Sulfate (as S) | 0.8% |
| Free sugars (total) | 28.0% |
| Total sugars (after hydrolysis) | 33.2% |
| Ammonium lignosulfonate | 67.0% |

The concentrated ammonia-base SSL (52.5 g., 30 g. oven dried) was placed in each of three stainless steel reaction vessels. Hexamine (30 g.) in water (80 ml.) was added to the vessel after adjustment of the solution of pH 4.0 with concentrated hydrochloric acid. The vessels were sealed and placed in an oven preheated to 200°C. After 2, 4 and 6 hours at 200°C the vessel was removed and cooled. The mixture in each vessel was osterized to break up solid agglomerates and the solids removed by filtering and rinsing prior to vacuum oven (50°C) drying. The filtrates were dialyzed in a sausage casing and then freeze dried.

The same reaction was repeated at 170° and 230°C for 2, 4 and 6 hours and at 200°C for 2 hours with smaller amounts of hexamethylenetetramine. The results are set forth in the following table.

TABLE I

| Example | Hexamine Wt., g. | Temp., °C. | Time, hr. | Solid Product[a] Wt. %[b] | % N Total | % N Org. Comb. |
|---|---|---|---|---|---|---|
| 1 | 30 | 170 | 2 | 79 | 8.9 | — |
| 2 | 30 | 170 | 4 | 80 | 9.2 | — |
| 3 | 30 | 170 | 6 | 70 | 9.5 | — |
| 4 | 30 | 200 | 2 | 92 | 10.0 | 9.7 |
| 5 | 30 | 200 | 4 | 94 | 10.0 | — |
| 6 | 30 | 200 | 6 | 96 | 10.6 | — |
| 7 | 30 | 230 | 2 | 88 | 9.9 | 9.3 |
| 8 | 30 | 230 | 4 | 86 | 9.7 | — |
| 9 | 30 | 230 | 6 | 86 | 10.3 | — |

TABLE I-continued

| Example | Hexamine Wt., g. | Temp., °C. | Time, hr. | Solid Product[a] Wt. %[b] | % N Total | % N Org. Comb. |
|---|---|---|---|---|---|---|
| 10 | 15 | 200 | 2 | 83 | 7.3 | 7.1 |
| 11 | 10 | 200 | 2 | 77 | 6.9 | 6.6 |
| 12 | 5 | 200 | 2 | 75 | 5.3 | 4.6 |

[a] Water insoluble product.
[b] Based on weight of starting material.

As can be seen from Table I, the amount of organically bound nitrogen found in those examples analyzed was over 94% of the total nitrogen content. (In this, as well as the following tables, organically combined nitrogen levels were determined for selected examples only as this was adequate to establish trends). The Table also shows that reaction times in excess of 2 hours have minimal effect on nitrogen incorporation or yield. The effect of concentration is seen by comparison of the 200°C reactions for 2 hours at the various hexamine concentrations. The results show that in going from a 1:1 weight ratio of hexamine to SSL solids (Example 4) to a weight ratio of 0.17:1 (Example 12), the yield decreases by 17% and total nitrogen goes from 10 to 5.3%. Within economic limitations, it is therefore desirable to use as much hexamethylenetetramine as possible to maximize nitrogen incorporation by the mass action effect.

EXAMPLE 13 to 19

Concentrated ammonia-base SSL (52.5 g., 30 g. O.D.) was placed in a stainless steel reaction vessel. A solution containing concentrated ammonium hydroxide (56.6 ml., 14.6 g. ammonia) and formaldehyde (104 ml., 41.3 g. formaldehyde) was added. The vessel was sealed and placed in an oven. After heating for 2 hours at 200°C., the reaction container was removed and cooled. The mixture was osterized to break up the solid agglomerates and the solids removed by filtering and rinsing prior to vacuum oven (50°C) drying, 25.2 g.

The same reaction was repeated varying the ratios of $NH_3$, formaldehyde and SSL. Reaction times of less than two hours were also used. Results are set forth in Table II.

SSL is preferable, the upper limit of this ratio being determined essentially by the ability to recover unreacted excess reagents.

EXAMPLES 20 to 25

Examples 13 to 19 were repeated at 230°C with varying amounts and molar ratios of ammonia:formaldehyde for shorter times. Results are set forth in Table III.

TABLE III

| Example | Weight (g.) $NH_3$ | $CH_2O$ | Molar Ratio $NH_3$:$CH_2O$ | Time hr. | Water Insoluble Product Yield % | % N Total | %N Org. Comb. |
|---|---|---|---|---|---|---|---|
| 20 | 13.4 | 38.2 | 2:3 | 1 | 79 | — | — |
| 21 | 18.2 | 34.3 | 1:1 | 1 | 76 | 11.8 | 11.7 |
| 22 | 26.6 | 25.4 | 2:1 | 1 | 61 | — | — |
| 23 | 13.4 | 38.2 | 2:3 | 0.5 | 79 | — | — |
| 24 | 18.2 | 34.3 | 1:1 | 0.5 | 72 | 11.4 | 11.3 |
| 25 | 26.6 | 25.4 | 2:1 | 0.5 | 59 | — | — |

Weight ratios of ammonia and formaldehyde to SSL were 1.7:1.0 in the above Examples. It is apparent from this data that it would be preferable to carry out the reaction at 230°C for 0.5 hour (Example 20) rather than 200°C for 2 hours (Example 14, Table II), the period of time required to obtain best results at 200°C. The yield of water insoluble product is only 3% less at the much shorter reaction time.

EXAMPLES 26 to 31

Sodium-base SSL was used in these examples. The liquor was concentrated to a total solids content of 50.7% and a viscosity of 2.4 poises. The concentrated sodium-base SSL had the following analyses:

| | |
|---|---|
| Sodium | 4.4% |
| Sulfur (total) | 5.1% |
| Sulfite (as S) | 0.03% |
| Sulfate (as S) | 0.09% |
| Total Sugars (after hydrolysis) | 28.5% |
| Sodium Lignosulfonate | 64.0% |

TABLE II

| Example | Weight (g.) $NH_3$ | $CH_2O$ | Molar Ratio $NH_3$:$CH_2O$ | Wt. ratio $NH_3$:$CH_2O$ Mix to SSL | Time | Solid Product Wt. % | % N Total | % N Org. Comb. |
|---|---|---|---|---|---|---|---|---|
| 13 | 14.6 | 41.3 | 2.3 | 1.86:1.00 | 2 | 84 | 10.0 | 9.8 |
| 14 | 18.2 | 34.3 | 1.1 | 1.75:1.00 | 2 | 82 | 10.5 | 10.3 |
| 15 | 24.4 | 23.0 | 2:1 | 1.58:1.00 | 2 | 64 | 10.4 | 10.1 |
| 16 | 9.1 | 17.1 | 1:1 | 0.88:1.00 | 2 | 68 | 9.8 | 9.7 |
| 17 | 4.6 | 8.5 | 1:1 | 0.43:1.00 | 2 | 63 | 7.8 | 7.4 |
| 18 | 18.2 | 34.3 | 1:1 | 1.68:1.00 | 0.5 | 54 | 10.4 | 10.2 |
| 19 | 18.2 | 34.3 | 1:1 | 1.68:1.00 | 1 | 62 | 10.8 | 10.7 |

Table II shows that an ammonia-formaldehyde ratio of 1:1 in Example 14 gave best results in yield (82 weight %) and nitrogen content (10.5% total, 10.3% combined nitrogen). The yield was substantially reduced at a 2:1 ratio in Example 15. These results indicate that a minimum level of formaldehyde is desirable to promote satisfactory crosslinking and insolubilization. The ratios of ammonia and formaldehyde to SSL are also seen to affect yield and nitrogen content at the same ammonia:formaldehyde ratio (1:1), time (2 hours) and temperature (200°C). In general, a weight ratio of at least 0.9:1 of ammonia and formaldehyde to Concentrated sodium-base SSL (59.2 g., 30 g. O.D.) was placed in a stainless steel reaction vessel. Hexamine (30 g.) in water (80 ml.) was added to the vessel after adjustment of the solution to pH 4.0 with concentrated hydrochloric acid. The reaction container was sealed and placed in an oven preheated to 200°C. After 2 hours at 200°C, the vessel was removed and cooled. The product mixture was osterized to break up solid agglomerates and the solids removed by filtering and rinsing prior to drying in a vacuum oven (50°C), 23.5 g.

The same reaction was repeated with different amounts and proportions of hexamine to SSL and at a temperature of 170°C in place of 200°C. Reaction-times were 2 hours. The results are set forth in Table IV.

TABLE IV

| Exam-ple | Hexamine Wt., g. | Wt. Ratio Hexamine to SSL | Solid Products Temp., °C | Wt. % | % N Total | % N Org. Comb. |
|---|---|---|---|---|---|---|
| 26 | 30 | 1.0:1.0 | 170 | 65 | 9.1 | 8.9 |
| 27 | 15 | 0.5:1.0 | 170 | 61 | 7.6 | 7.4 |
| 28 | 10 | 0.3:1.0 | 170 | 59 | 6.6 | 6.3 |
| 29 | 30 | 1.0:1.0 | 200 | 78 | 10.3 | 10.2 |
| 30 | 15 | 0.5:1.0 | 200 | 73 | 8.9 | 8.8 |
| 31 | 10 | 0.3:1.0 | 200 | 70 | 7.6 | 7.5 |

The results show higher yields at 200°C than at 170°C as was the case with ammonia-base SSL. Similarly, nitrogen incorporation drops off as ratios of hexamine:SSL are dropped from 1:1 to 0.3:1, again indicating the desirability of using as much hexamine as possible to maximize nitrogen incorporation.

EXAMPLES 32 to 36

Concentrated sodium-base SSL (59.2 g., 30 g. O.D.) was placed in a stainless steel reaction vessel. A solution containing concentrated ammonium hydroxide (72 ml., 18.2 g. ammonia) and formaldehyde (87 ml., 34.3 g. formaldehyde) was added. The vessel was sealed and placed in an oven. After heating for 2 hours at 200°C, the vessel was removed and cooled. The mixture was osterized to break up the solid agglomerate and the solids removed by filtering and rinsing prior to vacuum oven (50°C) drying 17.1 g.

The same reaction was repeated using a 1:1 ratio of ammonia:formaldehyde in each case by varying the amount and ratio of ammonia and formaldehyde to SSL and the reaction time. Results are set forth in Table V.

TABLE V

| Example | Wt. NH$_3$ | Wt., g. CH$_2$O | Wt. of NH$_3$:CH$_2$O Mix to SSL | Time Hr. | Solid Product Wt. % | % N Total | % N Org. Comb. |
|---|---|---|---|---|---|---|---|
| 32 | 18.2 | 34.3 | 1.75:1.00 | 2 | 57 | 11.1 | 11.0 |
| 33 | 9.1 | 17.1 | 0.88:1.00 | 2 | 55 | 9.6 | 9.5 |
| 34 | 4.6 | 8.5 | 0.43:1.00 | 2 | 55 | 7.5 | 7.4 |
| 35 | 18.2 | 34.3 | 1.75:1.00 | 0.5 | 30 | 10.2 | 10.1 |
| 36 | 18.2 | 34.3 | 1.75:1.00 | 1 | 44 | 10.6 | 10.5 |

Table V indicates again that a weight ratio of ammonia and formaldehyde:SSL of 0.9:1 or greater is desirable to maximize nitrogen incorporation and that greatest yields are obtained at 2 hour reaction times.

EXAMPLES 37 to 45

Examples 32 to 36 were repeated varying the amount and molar ratio of ammonia:formaldehyde and the temperature and time of reaction. Results are as follows:

TABLE VI

| Example | Wt., g. NH$_3$ | Wt., g. CH$_2$O | Ratio NH$_3$:CH$_2$O | Temp. °C | Time Hr. | Water Insoluble Products Yield % | % N Total | % N Org. Comb. |
|---|---|---|---|---|---|---|---|---|
| 37 | 13.4 | 38.2 | 2:3 | 230 | 1 | 79 | 11.1 | 11.1 |
| 38 | 18.2 | 34.3 | 1:1 | 230 | 1 | 67 | — | — |
| 39 | 26.6 | 25.4 | 1:2 | 230 | 1 | 53 | — | — |
| 40 | 13.4 | 38.2 | 2:3 | 230 | 0.5 | 80 | 10.7 | 10.6 |
| 41 | 18.2 | 34.3 | 1:1 | 230 | 0.5 | 67 | — | — |
| 42 | 26.6 | 25.4 | 1:2 | 230 | 0.5 | 53 | — | — |
| 43 | 13.4 | 38.2 | 2:3 | 200 | 2 | 76 | 10.4 | 10.3 |
| 44 | 26.6 | 25.4 | 1:2 | 200 | 2 | 40 | — | — |
| 45 | 18.2 | 34.3 | 1:1 | 170 | 1 | 30 | 10.5 | 10.4 |

Table VI indicates that in the case of sodium-base SSL, ammonia:formaldehyde molar ratios of 2:3 give yields substantially higher than ratios of 1:1, at what appear to be slightly reduced nitrogen levels.

The products of the invention were evaluated both for their effectiveness in the promotion of plant growth and their ability to be tolerated by plants without adverse effects. The tests were conducted on Douglas fir seedlings. Each seedling was planted in a 1500 g. mixture of soil containing various percentages of the products of the invention. The products used were those prepared from sodium-base SSL, ammonia and formaldehyde containing 11% N. Two seedlings were planted at each percentage level. For purposes of control, seedlings were similarly planted in 1500 g. soil mixtures containing no additive. The height of the plants was measured at the beginning of the experiment and after one year. The percent of growth of the plant containing additives of the invention compared to the control plants was calculated. The results are set forth in Table VII.

TABLE VII

| % of Additive in Soil | Average Ht. Growth % | % Growth Compared to Control |
|---|---|---|
| 10 | 35.4 | 104 |
| 5 | 45.4 | 134 |
| 2.5 | 41.2 | 122 |
| 1 | 41.9 | 124 |
| 0.5 | 62.6 | 185 |
| .25 | 49.0 | 144 |
| .1 | 47.2 | 139 |
| control | 33.9 | 100 |

The seedlings showed good tolerance to the plant mixtures employed: no toxic effects were observed. It will be noted that best results were observed for the seedlings grown in soil containing from 0.1 to 0.5% of the additives of the invention. Depending on use, the additives may be present in amounts ranging from as little as 0.1 to 20%, based upon soil weight.

The products of the invention have their greatest utility as slow-release nitrogen fertilizers for crops such as pasture, turf and lawn grasses, ornamentals, trees and vegetables and for forest fertilization. They may also be used as soil conditioners for container grown plants. The products may also be compounded with other nitrogen, phosphorus or potassium nutrient sources to make complete fertilizers. The products have a porous matrix which permits their use as carriers for fertilizers and insecticides.

We claim:

1. A process for preparing a nitrogen containing, water insoluble product consisting essentially of
reacting in the absence of oxygen as a reactant spent sulfite liquor at a temperature from 170° to 250°C with a reactant selected from the group consisting of hexamethylenetetramine and ammonia:formaldehyde mixtures, over 94% of the total nitrogen of said reaction product being organically bound.

2. The process of claim 1 in which the reactant is hexamethylenetetramine.

3. The process of claim 1 in which the reactant is a mixture of ammonia and formaldehyde.

4. The process of claim 1 in which the reaction is carried out for from 15 minutes to 3 hours.

5. The process of claim 1 in which the weight ratio of reactant to spent sulfite liquor is greater than 0.5:1.

6. The process of claim 1 in which the temperature of reaction is from 200° to 230°C.

7. The process of claim 1 in which the spent sulfite liquor is ammonia-base.

8. The process of claim 1 in which the spent sulfite liquor is sodium-base.

9. The process of claim 3 in which the ratio of ammonia:formaldehyde is 0.5:1 to 2:1.

10. The product of the process of claim 1.

* * * * *